United States Patent [19]

Carrel

[11] Patent Number: 5,116,085
[45] Date of Patent: May 26, 1992

[54] SEALED EXPANSION JOINT

[75] Inventor: Ralph E. Carrel, Fountain Inn, S.C.

[73] Assignee: Bishamon, Inc., Ontario, Calif.

[21] Appl. No.: 535,891

[22] Filed: Jun. 11, 1990

[51] Int. Cl.⁵ .............................................. F16L 21/02
[52] U.S. Cl. ..................... 285/225; 285/302;
   285/368; 285/24; 285/416; 285/114; 277/101
[58] Field of Search ............. 285/302, 368, 412, 224,
   285/225, 344, 24, 416, 114; 277/101, 166, 178, 183

[56] References Cited

U.S. PATENT DOCUMENTS

| | | | |
|---|---|---|---|
| 14,906 | 7/1856 | Bogart | 285/302 |
| 643,802 | 2/1900 | Morison | 285/302 |
| 1,558,592 | 10/1925 | Chester | 285/302 X |
| 1,868,014 | 7/1932 | Lucas | 285/368 X |
| 2,757,542 | 8/1956 | Klingler . | |
| 2,780,482 | 2/1957 | Brown | 285/368 X |
| 2,832,615 | 4/1958 | Summers | 285/368 X |
| 2,861,456 | 11/1958 | Soderberg . | |
| 2,949,787 | 8/1960 | Klingler . | |
| 3,224,598 | 12/1965 | Austgen . | |
| 3,244,013 | 4/1966 | Deschner . | |
| 3,416,819 | 12/1968 | Day . | |
| 3,827,731 | 8/1974 | Floessel et al. | 285/225 X |
| 4,000,921 | 1/1977 | Daspit | 285/368 X |
| 4,116,478 | 9/1978 | Yamaji et al. | 285/302 |
| 4,648,631 | 3/1987 | Bryant | 289/368 X |

Primary Examiner—Dave W. Arola
Assistant Examiner—Heather Chun
Attorney, Agent, or Firm—Dority & Manning

[57] ABSTRACT

An expansion joint is disclosed for connection between fluid flow conduits for permitting the expansion and contraction of the conduits while sealing same. The joint includes telescoping cylindrical members each connectable to a conduit and having a rolling seal or membrane connected therebetween to prevent leakage of fluid out of the joint. One of the members includes an inwardly turned, annular shoulder formed so as to closely surround the other member during full relative movement between the members to prevent the seal from coming in contact with foreign matter. The expansion joint is provided with a plurality of guide rods which are arranged circumferentially around the pipe joint and serve to lock the rolling seal in operative position with one member and to guide the movement of the other member during movement of members relative to each other.

10 Claims, 2 Drawing Sheets

1

SEALED EXPANSION JOINT

BACKGROUND OF THE INVENTION

This invention is directed to expansion joints and, more particularly, to pipe joints of the expansion type having provision for the expansion and contraction caused by changes in temperature of the external environment or by a transmitted fluid while continuously sealing the connection.

Commercial pipe expansion joints presently in use assume many varied forms, such, for example, as disclosed in the U.S. Pat. No. 3,416,819. In this patent, two telescoping pipe members are joined by a sleeve of flexible material which folds upon itself for permitting the elongation and contraction of the pipe members in accordance with temperature changes of the fluid flowing therethrough.

Use of flexible boots for providing a fluid-tight seal between telescoping parts is disclosed in U.S. Pat. No. 3,224,598. The use of rolling seals are also quite common in the prior art as illustrated in U.S. Pat. Nos. 2,757,542, 2,861,456, 2,949,787 and 3,244,013.

Problems exist with prior art structures of the types noted above. For example, there is no provision in such prior art of an arrangement whereby the rolling seal or membrane is protected against the intrusion of foreign material, or the steady accumulation of foreign material which eventually may be of sufficient mass to damage the membrane prematurely. Likewise, by example, none of the above cited and discussed patents provides means for avoidance of twisting or flexing of the pipe conduit members at the junction therebetween which includes the membrane seals and structural elements of the pipe joint. Continuous flexing of the pipe members at this juncture during expansion and contraction of the pipe members can produce stress sufficient to cause structural failure of the membrane seal thus rendering the pipe joint useless for the purposes intended.

The present invention overcomes the problems noted with respect to the prior art structure and is neither taught nor suggested thereby.

It is thus an object of the present invention to provide an improved, sealed expansion joint for a conduit system.

Another object of the present invention is to provide an improved expansion joint for a conduit system that remains sealed during expansion and contraction.

Still another object of the present invention is to provide an expansion joint in which a rolling diaphragm seal of same may be easily replaced.

Yet another object of the present invention is to provide an improved expansion joint for pipes and the like by providing the same with a structural arrangement which will protect a sealing membrane therefor at all times especially during extreme contraction and elongation of the pipe members to which it is associated.

Still further, another object of the present invention is to provide a constantly sealed expansion joint which avoids twisting, flexing or angular movement between the connecting pipe members to which the expansion joint is connected.

Another object of the present invention is to provide an improved expansion joint for conduit which includes a sealing membrane.

Generally speaking, the sealed expansion joint for connecting two conduit sections according to the present invention comprises a first member connectable to one of said conduit sections, said first member having a flange located therearound with a plurality of openings defined therein; a second member connectable to the other of said conduit sections, said first and second members being telescopeable with respect to each other, said second member having a flange therearound with a plurality of openings defined therein aligned axially with openings in said flange on said first member; a rolling seal removably secured at opposite ends to said members to effect a seal therebetween; means located about a portion of said seal to guide rolling of said seal and to shield said seal from external environs; and a plurality of guide rods removably secured between said flanges and being moveable with respect to one of said flanges whereby during expansion and contraction said seal is rolled while avoiding twisting stresses.

More particularly, the joint members are cylindrical in shape with one of the members having a free end that is smaller in diameter than the other to telescope within the other. The smaller diameter member defines a shoulder adjacent the outer free end with a threaded end section. An annular cap is threadably received about said threaded end section and locks an end of said seal against said shoulder. An opposite end of said seal is secured between said flange on said other of said joint members and a portion of an annular shield that extends downwardly therefrom and surrounds a portion of the seal intermediate its length. An inside surface of the downwardly extending portion of the annular member guides the rolling of the seal while protecting the seal from the elements.

More particularly, the present invention preferably includes an annular member surrounding the rolling membrane seal connected between the telescoping cooperative members of the joint members which guide the rolling action. The annular member is preferably in the form of an inwardly turned shoulder which surrounds the inner telescoping member with sufficient clearance to prevent contact therewith during use. The inner turned shoulder prevents the ingress of foreign material from coming in contact with the membrane seal and thereby completely lessens or eliminates the buildup of foreign material in the space adjacent the seal thereby preventing damage thereto as the seal is rolled during expansion and contraction of the pipe members.

In order to prevent twisting and angular displacement of the joint members, the expansion joint is preferably provided with a plurality of connecting rods arranged to surround the ends of the joint members, being secured to the respective flanges. These rods serve as guides for the movement of structural elements of the pipe joint and to prevent twisting therebetween and angular displacement of the pipe members. The rods are positioned outwardly from the axis of the pipe members a distance sufficient to enhance the prevention of these adverse actions.

Connecting rods as employed not only guide the joint members during expansion and contraction movement, but also permit ready replacement of the rolling seal. With a portion of the annular shield for the seal mating with the flange on the first joint member, an outer end of the seal can be secured therebetween, and with the mating portion of the shield and the end of the seal having openings that match openings in the flange, the guide rods can pass therethrough with locking members on the guide rods securing the end of the seal therebetween. Once it is desirable to remove or replace the seal, the rods may be removed, thus releasing the annular shield which may be moved away, releasing the end of the seal and exposing the rolling portion. The annular end cap on the inner member may then be removed releasing the other end of the seal.

These and other objects of the present invention will become obvious after reading the following description taken in conjunction with the drawings wherein:

DESCRIPTION OF THE PREFERRED EMBODIMENTS

Figure 1:
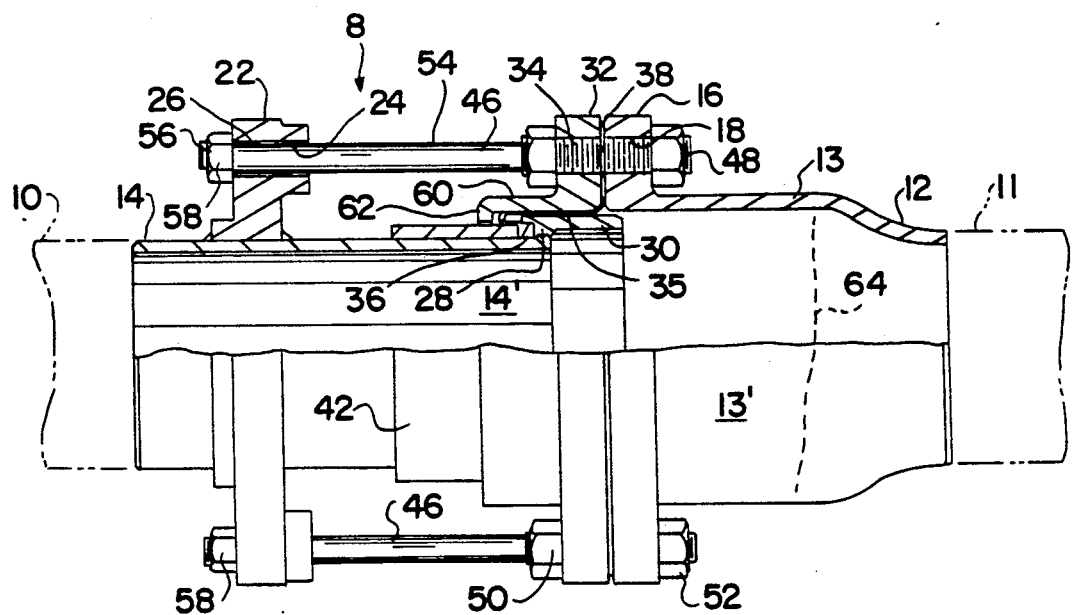
FIG. 1 is a plan view, partly in cross-section, of an expansion pipe joint device in accordance with the present invention and showing the connecting pipe members in one position.

As shown in FIG. 1, the expansion pipe joint of the present invention, generally indicated by the reference numeral 8, is devised and arranged for connection between ends of two conduit members 10, 11, to provide a connection therebetween which is sealed and permits elongation and contraction of the conduit members in response to temperature changes of the surrounding environment or by the passage of a fluid therethrough.

Conduit members, 10, 11 may be of any of the suitable types which conduct fluid such as liquids or steam or gases, and may be in the form of galvanized pipe or of other tubing conducting devices. Expansion joint 8 includes an annular member 12 which is securable to the free end of conduit section 11 and terminates at an enlarged end 13 defining an outer traverse chamber 13'. Joint 8 also includes an annular member 14 which is securable to the free end of an opposite conduit section 10 and defines an inner traverse chamber 14'. In the conventional manner, annular member 14 is adapted to telescope within the outer traverse chamber 13' of member 12 and is movable therein during expansion and contraction of the component parts. Enlarged end 13 of first annular member 12 has an outwardly extending flange or ring 16 which defines a plurality of threaded openings 18 spaced therearound.

Expansion joint 8 also includes a flange or ring 22 suitably secured as by welding to the exterior surface of annular member 14 which defines a plurality of openings 24 circumferentially spaced therearound. A sleeve-type bearing 26 is positioned within and fixed to the surfaces which define openings 24. The axes of the openings 24 are in alignment with the axes of the openings 18 formed in the flange ring 16.

The outer end of the second annular member 14, which protrudes into the outer traverse chamber member 12 in telescoping fashion therewith, is formed with a threaded portion 28 for threadably receiving a seal retaining ring or end cap 30 and which also serves as a guide for member 14 during movement of the same within the enlarged section 13 during expansion and contraction of the structural parts.

Figure 3:
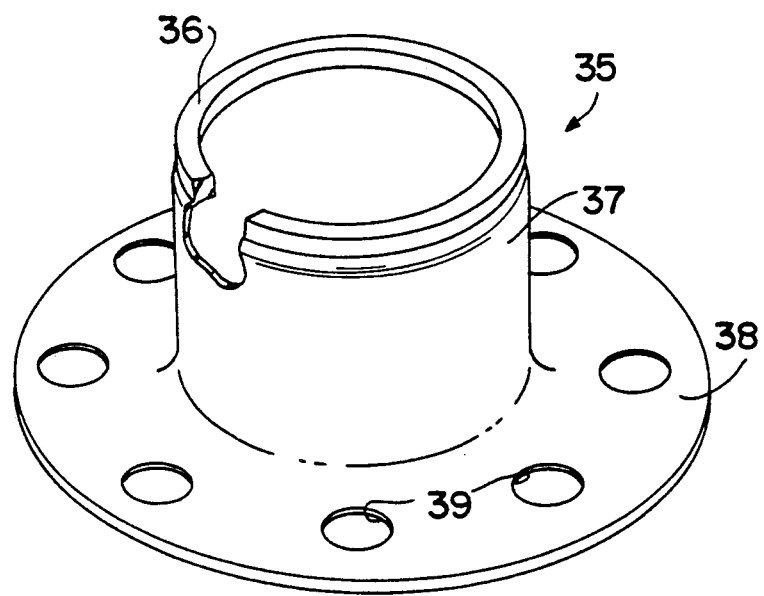
FIG. 3 is an isometric view of a rolling seal or membrane utilized in the present invention.

An annular membrane seal 35 is secured between the respective ends of first and second annular members 12 and 14 and is arranged for rolling movement during both expansion and contraction movement of members 12 and 14. In expansion movement, of course, second member 14 moves further into first member 12 while during contractive movement, the reverse is true. Seal 35 is a flexible element that will withstand repeated rolling movement without failure due to degradation, flex abrasions, or the like, while at the same time providing a seal across joint 8. Seal 35 preferably is constructed of a polymeric material that will not only withstand the physical rigors of movement, but which also will withstand chemical attack and exposure to the environs. In a most preferred arrangement as illustrated in FIG. 3, seal 35 is generally cylindrical in shape along a shank 37 terminating at one end at an out-turned rim 38 which defines a plurality of openings 39 therein which are matched to openings 18 in flange 16. At an opposite end of shank 37 is a bead 36.

An outer, annular seal support flange 32 surrounds retaining ring 30 and is formed with a plurality of threaded openings 34 circumferentially spaced therearound and in axial alignment with the openings 18 of flange 16. Between the ring flange 16 and the outer seal support flange 32, rim portion 38 of seal membrane 35 is positioned and arranged with annular inner bead 36 at an opposite end of seal 35 in tight-fitting contact with the exterior surface of the member 14 adjacent the threaded portion 28. As with conventional rolling seals, in its normal unflexed condition, as shown in FIG. 3, the rolling seal or membrane 35 includes a cylindrical shank 37 and a flat rim 38 formed with holes 39. The rim 38 is positioned between the ring 16 and the flange 32 with the holes in alignment with the openings 18, 34.

Bead 36 of the membrane 35 is retained within a groove 40 formed in the retaining ring or end cap 30 and is held therein by a cylindrical element or shoulder 42 secured to the outer surface of the member 14 which also serves to permit the rolling of the seal membrane 35 thereon during movement of the members 13 and 14 caused by the expansion and contraction of the conduits 10, 11.

A plurality of guide rods 46 are mounted within the aligned openings 18, 24 and 34. The rods 46 are formed with threaded portions 48 which are threadably received in the openings 18, 34. Fastening devices such as nuts 50, 52 arranged on the threaded portion 48, on opposed sides of the rings 16, 32 serve to tighten the flange rings against each other, thereby locking the rim 38 of seal membrane 35 in position for operation of the joint 8.

Figure 2:
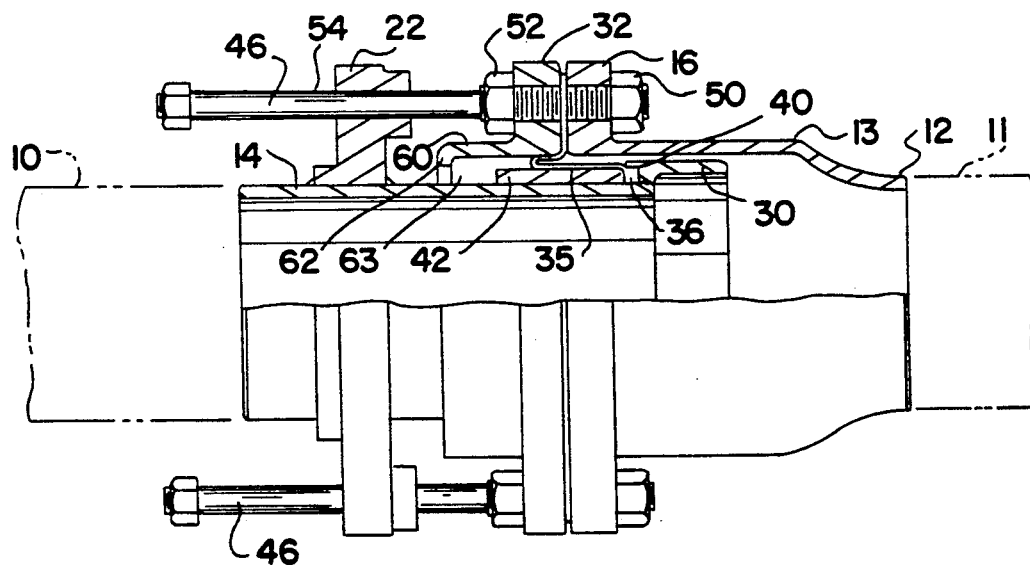
FIG. 2 is a plan view similar to that of FIG. 1 showing the pipe members in another position.

As shown in FIGS. 1 and 2, the rods 46 are formed with smooth portions 54 adapted to be slidably received within the guide rod bearings 26 formed in the flange ring 22. At the extreme end of each of the rods 46, a threaded portion 56 is devised for cooperation with locking nuts 58 which serve to hold the member 14 against dismantling and to limit the outward movement of the member 14 relative to the member 13.

In order to prevent the intrusion of foreign material within the spaces occupied by the rolling seal membrane 35 as the same is rolled along the exterior surface of the cylindrical element 42, the outer seal support flange 32 is formed with a cylindrical member 60 which surrounds the outer end of the member 14 adjacent the threaded portion 28, the retaining ring 30 and completely around the membrane 35. The cylindrical element 60 is formed with an annular shoulder 62 at one end thereof which is closely spaced from the cylindrical element 42 to generally prevent the intrusion of foreign material in the space 63 between the element 60 and inner opposed structure of the member 14 as well as structurally reinforcing member 60. Cylindrical element 60 also performs an important function as a barrier against outward expansion of seal 35 which, if unimpeded, could result in rupture. In other words, increased pressures within the conduit can act as seal 35 and, in the absence of such a barrier, seal 35 could "blow out" or rupture. Also, in the event of rupture of seal 35, cylindrical member 60 channels escaping fluid such as steam and the like axially along the joint instead of outwardly and lessens the possibility of injury to passersby.

In operation, the expansion joint 8 is capable of permitting the expansion and contraction of the pipes 10, 11 a distance equivalent to the movement of the member 14 from the position shown in FIG. 1 to the position shown in FIG. 2, or to the line 64 shown in FIG. 1. During movement of the pipes to these extreme positions, the membrane 35 rolls upon the outer surface of the element 42 thereby providing a seal against the egress of fluid flowing through the pipe members 10, 12. During these extreme movements of the joint members, the shoulder 60 prevents the ingress and accumulation of foreign material within the space 63 surrounding the membrane 35 thereby protecting the same from premature failure.

While the various members of expansion joint 8 have been illustrated and described as cylindrical in nature, other shapes may be employed so long as the requisite relationship between the parts is not affected thereby. Likewise while flanges 16, 22 are preferred as being continuous around joint members 12, 14, they each may be formed of a plurality of outwardly extending segments or other shapes.

From the foregoing it will be appreciated that the pipe joint devised in accordance with the present invention provides a connection between fluid flow conduits which permit the expansion and contraction therebetween with a minimal amount, if any, of the axial displacement of one conduit relative to the other. With the novel use of guide rods constructed and arranged in accordance with the invention, the integrity of the angular relationship of the conduits is maintained. In addition, a novel arrangement is devised to prevent the build-up of foreign material in the vicinity of the rolling seal and thereby prevent premature damage thereto.

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitative of the invention so further described in such appended claims.

What is claimed is:

1. An improved expansion joint for connecting two conduit sections to permit expansion and contraction thereof in accordance with temperature changes in fluids flowing therethrough, ambient temperature or other external sources comprising:
   a first member connectable to one of said conduit sections, said first member having a flange located therearound with a plurality of openings defined therein;
   a second member connectable to the other of said conduit sections, said first and second members having opposing ends telescopeable with respect to each other, said second member having a flange therearound, said flange defining a plurality of openings therein, said openings being in axial alignment with openings in said flange on said first member;
   a rolling seal removably secured at said opposing ends of each of said members to effect a seal therebetween;
   means located about a portion of said seal to guide rolling of the seal and shield the seal from external environs; and
   a plurality of guide members removably secured between said flanges and being movable with respect to one of said flanges, whereby during expansion and contraction, said seal is rolled while avoiding twisting stresses.

2. An improved expansion joint as defined in claim 1 wherein said flange on said second member has sleeve-type bearings received in the flange openings permitting said guide members to slide relative to same.

3. An improved expansion joint as defined in claim 1 wherein said second joint member defines a surface on which said seal may roll during expansion.

4. An improved expansion joint as defined in claim 3 wherein said surface defines a shoulder at an end of same against which an end of said seal is held.

5. An improved expansion joint as defined in claim 1 wherein said seal shield means comprises an annular element having a rim portion which cooperates with said flange on said first joint member and said guide members to hold an outer end of said seal and has a laterally and downwardly extending portion which is located around a portion of said seal and generally encloses said portion of said seal about said second member.

6. An expansion pipe joint for connecting conduits to permit expansion and contraction thereof in accordance with temperature changes in fluids flowing therethrough or of the surrounding environment comprising:
   a first cylindrical member connectable to one of the conduits having a flange therearound formed with openings therein,
   a second cylindrical member connectable to the other conduit and having an open end arranged for telescoping insertion within said first member, said second member having a flange therearound and secured thereto, said flange being formed with openings therein in axial alignment with said openings in said flange on first member,
   an annular member having a rim therearound formed with openings arranged in axial alignment with said openings in said flange on said first member, means cooperable with said openings for securing said rim on said annular member on said flange of said first member,
   a rolling seal device removably secured between said members, said annular member including an annular shoulder, protruding inwardly toward said second member and closely spaced therefrom being arranged to surround said seal, and
   a plurality of guide rods arranged circumferentially around said cylindrical members, each of said rods being secured at one end to said flange of said first member and said rim of said annular member, each of said rods being slidably connected at the other end thereof to said flange of said second member for permitting the movement of said first member relative to said second member during expansion and contraction of the conduits.

7. An expansion pipe joint for connecting conduits to permit expansion and contraction thereof in accordance with temperature changes in fluids flowing therethrough or of the surrounding environment comprising:
- a first cylindrical member connected to one of the conduits having a flange therearound formed with openings therein,
- a second cylindrical member connected to the other conduit and having an open end arranged for telescoping insertion within said first member, said second member having a flange therearound formed with openings therein in axial alignment with said openings in said flange of first member,
- a rolling seal device arranged between said members and across said open end of said second member,
- means for producing rolling contact of said seal device upon said second member during movement of one member relative to the other in accordance with the expansion or contraction of the conduits, and
- guide means arranged in sliding relationship between said first member and said second member for guiding movement therebetween and thereby minimize angular misalignment of said members.

8. The pipe joint as defined in claim 7 wherein said guide means includes a plurality of guide rods spaced circumferentially around said members.

9. The pipe joint as defined in claim 8 wherein one end of each of the rods is secured to one of said members and the other end of each of the rods is slidably connected to the other member.

10. An improved expansion joint for connecting two conduit sections to permit expansion and contraction thereof in accordance with temperature changes in fluids flowing therethrough, ambient temperature or other external sources comprising:
- a first member connectable to one of said conduit sections, said first member having a flange located therearound with a plurality of openings defined therein;
- a second member connectable to the other of said conduit sections, said first and second members being telescopable with respect to each other, said second member having a flange therearound, said flange defining a plurality of openings in said flange on said first member;
- a rolling seal removably secured at opposite ends to said members to effect a seal therebetween;
- means located about a portion of said seal to guide rolling of the seal and shield the seal from external environs;
- a plurality of guide members removably secured between said flanges and being movable with respect to one of said flanges, whereby during expansion and contraction, said seal is rolled while avoiding twisting stresses;
- a surface on which said seal may roll during expansion, said surface being defined by said second member, said surface further defining a shoulder at an end of same against which an end of said seal is held; and
- an end cap in threaded engagement with said second member, said end cap holding said end of said seal against said shoulder.

* * * * *